United States Patent

Inuzuka et al.

Patent Number: 5,505,670
Date of Patent: Apr. 9, 1996

[54] AUTOMATIC TRANSMISSION

[75] Inventors: Takeshi Inuzuka; Masashi Hattori, both of Anjo; Yasuo Hojo, Nagoya; Kunihiro Iwatsuki, Toyota; Shinji Kasuga, Anjo, all of Japan

[73] Assignee: Aisin Aw Co., Ltd., Japan

[21] Appl. No.: 272,216

[22] Filed: Jul. 8, 1994

[30] Foreign Application Priority Data

Jul. 9, 1993 [JP] Japan .................. 5-170229

[51] Int. Cl.⁶ .................. F16H 61/14
[52] U.S. Cl. .................. 477/65; 477/63
[58] Field of Search .................. 477/63, 65

[56] References Cited

U.S. PATENT DOCUMENTS

| | | | |
|---|---|---|---|
| 4,495,576 | 1/1985 | Ito | 477/63 |
| 4,651,593 | 3/1987 | Aoki et al. | 477/65 |
| 4,753,135 | 1/1988 | Sotoyama et al. | 477/65 |
| 4,811,827 | 3/1989 | Ishikawa et al. | 477/65 |
| 5,010,990 | 4/1991 | Yoshimura et al. | 477/63 |
| 5,160,002 | 11/1992 | Suzuki | 477/65 |

*Primary Examiner*—Dirk Wright
*Attorney, Agent, or Firm*—Lorusso & Loud

[57] ABSTRACT

A lockup clutch of an automatic transmission is controlled so that no shock is produced while the vehicle is running within a predetermined gear stage. The automatic transmission includes a fluid coupling; a lockup clutch provided in the fluid coupling; a shift selector for selecting a range; a vehicle speed sensor for detecting vehicle speed, and a throttle opening sensor for detecting throttle opening. A control unit determines a gear stage in accordance with the selected range, the vehicle speed and the throttle opening, decides a shift, produces a shifting output signal, decides ON or OFF for the lockup clutch in accordance with the selected range, the vehicle speed and the throttle opening, and produces a lockup ON/OFF output signal. An oil pressure circuit actuates solenoid valves in response to the shifting output signal and the lockup ON/OFF output signal of the control unit. The solenoid valves, in turn, control engagement and release of frictional engagement elements to achieve the decided gear stage and control engagement and release of the lockup clutch. The control unit includes, stored in memory, a lockup diagram set with an ON/OFF hysteresis area; a comparator for deciding whether or not the vehicle speed and the throttle opening, at the time of a shifting output signal is produced, are within the ON/OFF hysteresis area of the lockup diagram; and a lockup output signal generator for turning the lockup output ON if the vehicle speed and the throttle opening are within the ON/OFF hysteresis area when the shifting output signal is produced.

4 Claims, 16 Drawing Sheets

| POSITION | | | SOLENOID | | | CLUTCH | | | BRAKE | | | |
|---|---|---|---|---|---|---|---|---|---|---|---|---|
| | | | S1 | S2 | S3 | C1 | C2 | C0 | B1 | B2 | B3 | B0 |
| D | AUTO. | 1 ST | ○ | × | × | ○ | × | ○ | × | × | × | × |
| | | 2 ND | ○ | ○ | × | ○ | × | ○ | × | ○ | × | × |
| | | 3 RD | × | ○ | × | ○ | ○ | ○ | × | ○ | × | × |
| | | 4 TH | × | × | × | ○ | ○ | × | × | ○ | × | ○ |
| | MANU. | 1 ST | ○ | × | ○ | ○ | × | ○ | × | × | ○ | × |
| | | 2 ND | ○ | ○ | ○ | ○ | × | ○ | ○ | ○ | × | × |
| S | | 1 ST | ○ | × | × | ○ | × | ○ | × | × | × | × |
| | | 2 ND | ○ | ○ | ○ | ○ | × | ○ | ○ | ○ | × | × |
| | | 3 RD | × | ○ | × | ○ | ○ | ○ | × | ○ | × | × |
| | | (3RD) | × | × | × | ○ | ○ | ○ | × | ○ | × | × |
| L | | 1 ST | ○ | × | ○ | ○ | × | ○ | × | × | ○ | × |
| | | 2 ND | ○ | ○ | ○ | ○ | × | ○ | ○ | ○ | × | × |
| | | (1ST) | × | × | × | ○ | × | ○ | × | × | ○ | × |
| REMARKS | | ○ : ON | APPLIED | | | | | | | | | |
| | | × : OFF | RELEASED | | | | | | | | | |

FIG. 3

AUTOMATIC TRANSMISSION

BACKGROUND OF THE INVENTION

1. Field of the Invention

The present invention relates to an automatic transmission.

2. Description of the Related Art

The conventional automatic transmission provides parking (P), reverse (R), neutral (N), drive (D), second (S) and low (L) ranges so that it can change the vehicle speed automatically, responsive to selection of a range by the driver.

Specifically, when the driver selects a range, a control unit sets a gear stage, decides the shift and produces shifting output signals in accordance with the selected range, the vehicle speed and the throttle opening. Moreover, an oil pressure circuit actuates servo valves to apply/release frictional engagement elements corresponding to the set gear stage to thereby achieve the set gear stage in accordance with the shifting output signals of the control unit.

The rotation produced by the engine is transmitted through a fluid coupling to the transmission. In order to improve the mileage, however, the fluid coupling has a lockup clutch which engages when the vehicle speed reaches a predetermined value. Accordingly, if the speed at which the lockup clutch is to be engaged is set at a low value, the mileage can be correspondingly improved.

In the lockup diagram, therefore, a lockup area set for turning ON/OFF the lockup output is enlarged at the lower vehicle speed side.

In the ordinary automatic transmission, on the other hand, the selection of each range according to the intention of the driver is effected by moving the shift lever between the range positions arranged in a linear array. Thus, any one of the range positions arrayed in the so-called "I" line can be selected.

In this case, however, the gear stages cannot be freely and manually selected with a sufficient feel of a manual shift. Thus, there is provided a shift pattern in which the shift positions are arranged in the so-called "H-letter shape" array, as in the manual transmission. The "H-letter shape array is added to the range positions of the "I" pattern array, as used in the automatic transmission of the prior art, so that a range can be selected from those in the automatic transmission mode and in the manual transmission mode (as disclosed in Japanese Patent Laid-Open No. 157855/1986).

In order to achieve the feel of operation of a manual transmission, the manual transmission mode provides for operation of the lockup clutch over a wide range. Accordingly, lockup diagrams are provided which can be individually referred to in the automatic transmission mode and in the manual transmission mode, and the lockup area in the lockup diagram for the manual transmission mode is enlarged to the lower vehicle speed side.

In the automatic transmission of the prior art described above, however, enlargement of the lockup area in the lockup diagram over a wide range of engine rpm results in shock if the lockup clutch is locked up while the vehicle is running within some gear stage. As a result, not only may the driver be confused into thinking that the shift has been effected when the lockup clutch is locked up, but also driving comfort may be disturbed by an unexpected shock.

SUMMARY OF THE INVENTION

The present invention has as its object solution of the above-mentioned problems concomitant with the automatic transmission of the prior art. In other words, the object of the present invention is to provide an automatic transmission in which its lockup clutch does not cause any shock, regardless of the gear stage at which the vehicle is running, so as not to confuse the driver into thinking that a shift has occurred and to maintain driving comfort.

In order to achieve the above-specified object, the automatic transmission of the present invention includes: a fluid coupling; a lockup clutch in the fluid coupling; shift selecting means for selecting a range; a vehicle speed sensor for detecting vehicle speed, and a throttle opening sensor for detecting throttle opening. A control unit sets a gear stage in accordance with the selected range, the vehicle speed and the throttle opening. More specifically, the control unit decides a shift, produces a shift output signal, decides ON or OFF for said lockup clutch in accordance with the selected range, the vehicle speed and the throttle opening, and produces a lockup ON/OFF output signal. An oil pressure circuit actuates solenoid valves in response to the shift output signal and the lockup ON/OFF output signal from the control unit, for applying/releasing frictional engagement elements corresponding to the set gear stage and for engaging/releasing the lockup clutch. The control unit includes: a stored lockup diagram with an ON/OFF hysteresis area; comparator means for deciding whether or not the vehicle speed and the throttle opening, when the shift signals are output, are within the ON/OFF hysteresis area of the lockup diagram; and lockup output signal generating means for turning said lockup output ON if the vehicle speed and the throttle opening, at the time of the shift signal, are within the ON/OFF hysteresis area.

The comparator decides whether or not the vehicle speed and the throttle opening are within the ON/OFF hysteresis area of the lockup diagram. Then, the lockup output generator turns ON the lockup output if the vehicle speed and the throttle opening, at the time of a shifting output signal, are within the ON/OFF hysteresis area. Thus, since the lockup clutch is locked up if the vehicle speed is in the ON/OFF hysteresis area, the lockup area is enlarged.

Because the lockup output signal "ON is emitted simultaneously with the production of the shift output signal, the shift and the lockup are simultaneously effected. As a result, the lockup clutch is not locked up while the vehicle is running within a gear stage where a shock felt by the driver would result. Thus, the lockup clutch can be locked up at a low vehicle speed, enabling enlargement of the lockup area without incurring shock.

BRIEF DESCRIPTION OF THE DRAWINGS

FIG. 3 is a table of the operations of the automatic transmission according to the embodiment of FIG. 2;

DESCRIPTION OF THE PREFERRED EMBODIMENTS

Embodiments of the present invention will be described in detail below with reference to the accompanying drawings.

Figure 1:
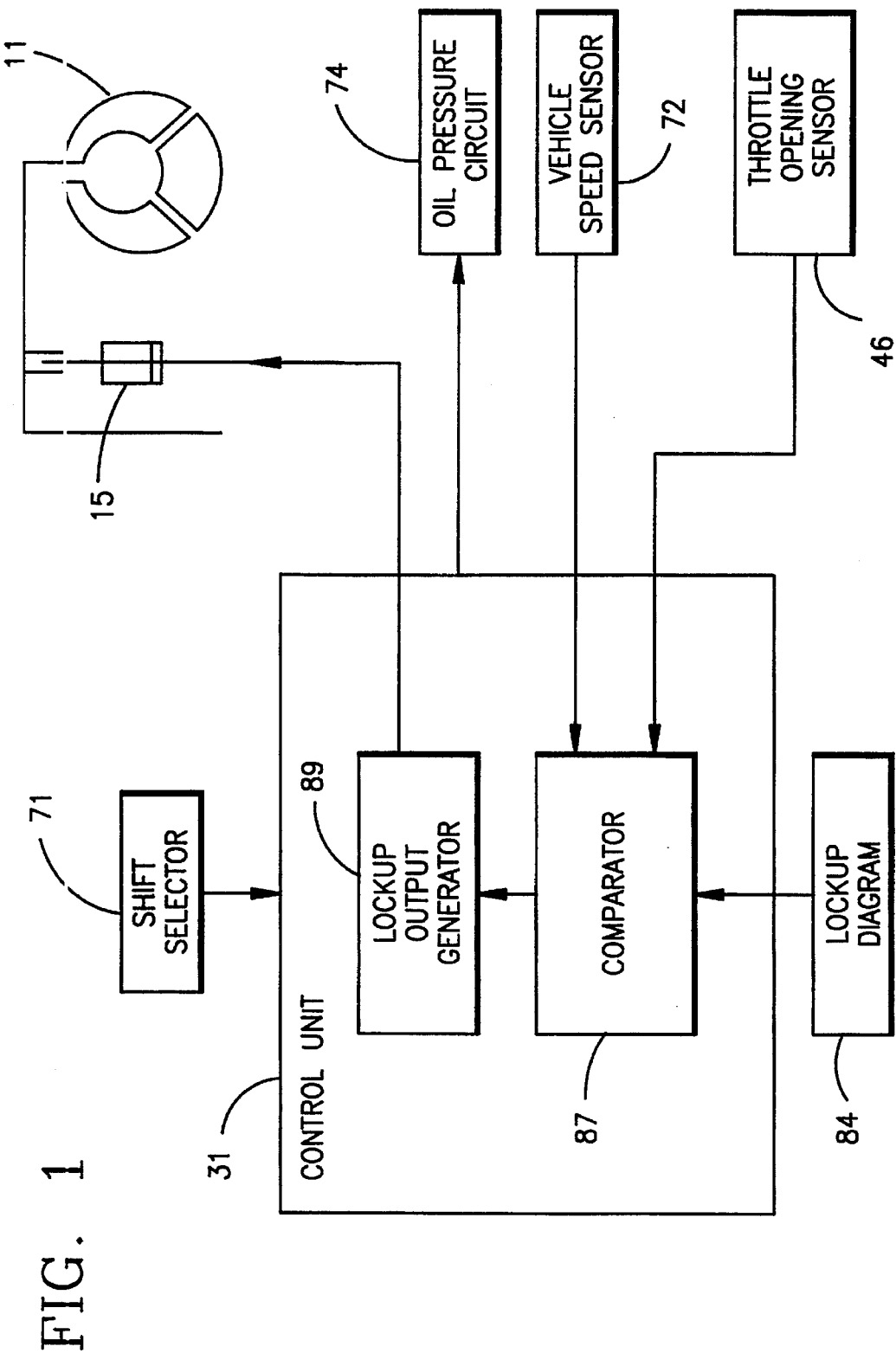
FIG. 1 is a block diagram showing a control system for an automatic transmission according to an embodiment of the present invention.

In FIG. 1, reference numeral 11 designates a fluid coupling, such as a torque converter, equipped with a lockup clutch 15. This lockup clutch 15 is engaged responsive to an "ON" lockup output signal from a control unit 31 and is released responsive to an "OFF" lockup output signal.

Inputs to the control unit 31 include at least a shift selector 71 for selecting ranges, a vehicle speed sensor 72 for detecting a vehicle speed v and a throttle opening sensor 46 for detecting a throttle opening. In accordance with the range selected by the shift selector 71, the detected vehicle speed v and the detected throttle opening, the control unit 31 decides a gear stage and outputs the shifting signals to establish that gear stage.

An oil pressure circuit 74 actuates solenoid valves (not shown) in response to the shift output signals from the control unit 31 to establish each gear stage.

Moreover, the control unit 31 is equipped with lockup output signal generator 89 for engaging/releasing the aforementioned lockup clutch 15. A stored lockup diagram 84 with ON/OFF hysteresis areas is provided for the control unit 31 to decide the lockup. A comparator 87 decides whether or not the aforementioned vehicle speed v and throttle opening are in the ON/OFF hysteresis areas of the lockup diagram 84. The lockup output generator 89 turns ON the lockup output if the vehicle speed v and the throttle opening, at the time a shift output signal is generated, are within one of the ON/OFF hysteresis areas.

Thus, the lockup area is effectively enlarged because the lockup clutch 15 is locked up when the vehicle speed v and the throttle opening are within one of the ON/OFF hysteresis areas.

Because, the lockup output is ON simultaneously with output of the shift signal, the shift and the lockup are simultaneously executed. Thus, the lockup clutch 15 is not locked up while the vehicle is running in any gear stage, so that the driver will not detect any shift shock due to the lockup. As e result, the lockup clutch 15 can be locked up even at a low vehicle speed thus enabling enlargement of the lockup area.

Figure 2:
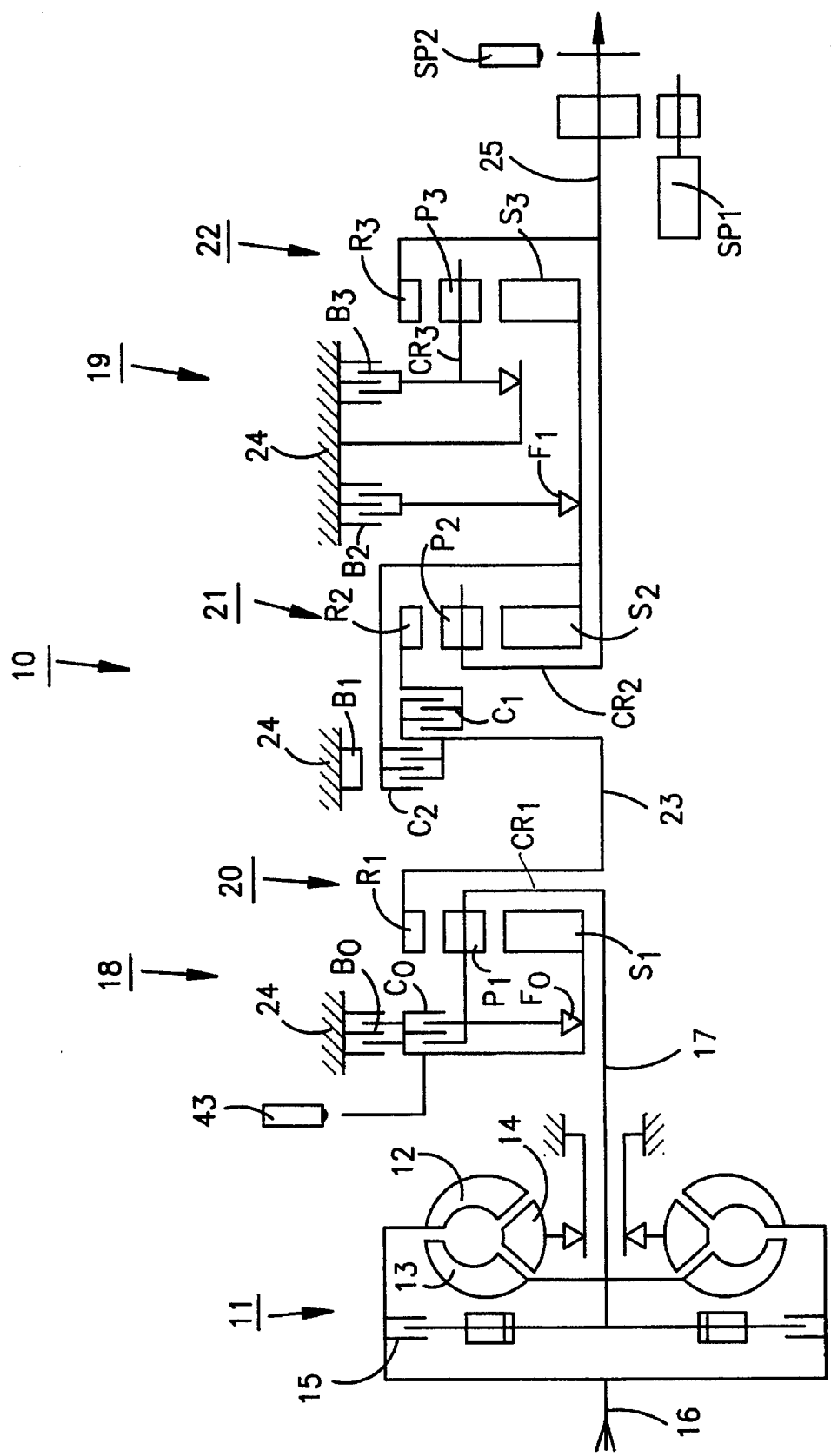
FIG. 2 is a schematic diagram of the automatic transmission according to the embodiment of the present invention controlled by the system shown in FIG. 1.

FIG. 2 shows a transmission 10 and the fluid coupling 11, exemplified by a torque converter. Thus, the rotation produced by the engine (not shown) is transmitted through the fluid coupling 11 to the transmission 10, wherein the rotary speed is changed and transmitted to the drive wheels (not shown).

The fluid coupling 11 includes a pump impeller 12, a turbine runner 13, a stator 14 and a lockup clutch 15 for improving the power transmission efficiency. The fluid coupling 11 transmits the rotation of an input member 16 to an input shaft 17 of the transmission 10, either indirectly through the oil flow in the fluid coupling or directly by locking up the lockup clutch 15.

The transmission 10 includes an auxiliary transmission unit 18 and a main transmission unit 19. The former is composed of an overdrive planetary gear unit 20 and the latter is composed of a front planetary gear unit 21 and a rear planetary gear unit 22.

The overdrive planetary gear unit 20 includes: carrier $CR_1$ connected to the input shaft 17 and supporting a planetary pinion $P_2$; a sun gear $S_1$ enclosing the input shaft 17; and a ring gear $R_1$ connected to an input shaft 23 of the main transmission unit 19. A third clutch C0 and a third one-way clutch F0 are arranged between the carrier $CR_1$ and the sun gear $S_1$, and a fourth brake B0 is arranged between the sun gear $S_1$ and a casing 24.

The front planetary gear unit 21 is composed of: a carrier $CR_2$ connected to an output shaft 25 and supporting planetary pinion $P_2$ sun gear $S_2$ enclosing the output shaft 25 and formed integrally with a sun gear $S_3$ of the rear planetary gear unit 22; and ring gear $R_2$ connected to the input shaft 23 through a first clutch C1. A second clutch C2 is arranged between the input shaft 23 and the sun gear $S_2$, and a first brake B1, in the form of a band brake, is arranged between the sun gear $S_2$ and the casing 24. A second brake B2 is arranged through a first one-way clutch F1 between the sun gear $S_2$ and the casing 24.

The rear planetary gear unit 22 is composed of: a carrier $CR_3$ supporting a planetary pinion $P_3$; the sun gear $S_3$; and a ring gear $R_3$ connected directly to the output shaft 25. A third brake B3 and the second one-way clutch F2 are arranged in parallel between the carrier $CR_1$ and the casing 24. Incidentally, numeral 43 designates an input RPM sensor, and characters SP1 and SP2 designate vehicle speed sensors.

The individual solenoid valves S1, S2 and S3, the individual clutches C0, C1 and C2, and the individual brakes B0, B1, B2 and B3 of the aforementioned automatic transmission are controlled at the individual gear stages of the ranges D, S and L, as tabulated in FIG.

Specifically, at first (1ST) speed in the D or S range, the first solenoid valve S1 is ON. As a result, the first clutch C1 and the third clutch C0 are applied whereas the second one-way clutch F2 and the third one-way clutch F0 are locked, and the remaining elements are released. As a result, the individual elements of the overdrive planetary gear unit 20 are integrated into the direct drive state through the third clutch C0 and the third one-way clutch F0 so that the rotation of the input shaft 17 is transmitted as is to the input shaft 23 of the main transmission unit 19.

In the main transmission unit 19, on the other hand, the rotation of the input shaft 23 is transmitted through the first clutch C1 to the ring gear $R_2$ of the front planetary gear unit 21 and further to the carrier $CR_2$ and the output shaft 25 integrated with the carrier $CR_2$. At this time, the counter-clockwise rotation is transmitted through the sun gears $S_2$ and $S_3$ to the carrier $CR_3$ of the rear planetary gear unit 22.

However, since this rotation is blocked because the second one-way clutch F2 is locked, the planetary pinion $P_3$ rotates about its axis to transmit the power to the ring gear $R_3$ integrated with the output shaft 25.

At the second (2ND) speed in the D range, on the other hand, not only the first solenoid valve S1 but also the second solenoid valve S2 is switched ON. As a result, the first clutch C1, the third clutch C0 and the second brake B2 are applied whereas the first one-way clutch F1 and the third one-way clutch F0 are locked, and the remaining elements are released. As a result, the overdrive planetary gear unit 20 is held in the direct drive state so that the rotation of the input shaft 17 is transmitted as is to the input shaft 23 of the main transmission unit 19. In this main transmission unit 19, on the other hand, the rotation of the input shaft 23 is transmitted through the first clutch C1 to the ring gear $R_2$ of the front planetary gear unit 21 so that the counter-clockwise rotation is transmitted through the planetary pinion $P_2$ to the sun gear $S_2$. However, the rotation of this sun gear $S_2$ is blocked by the first one-way clutch F1 which is locked by the engaged second brake B2. As a result, the carrier $CR_2$ is rotated while allowing the planetary pinion $P_2$ to rotate about its axis, so that the rotation at the 2nd speed is transmitted to the output shaft 25 only through the front planetary gear 21.

At the third (3RD) speed in the D or S range, on the other hand, the first solenoid valve S1 is OFF. As a result, the first clutch C1, the second clutch C2, the third clutch C0 and the second brake B2 are applied, whereas the third one-way clutch F0 is locked, and the remaining elements are released. As a result, the overdrive planetary gear unit 20 is held in the direct drive state. In the main transmission unit 19, on the other hand, the individual elements of the front planetary gear unit 21 are integrated by the engagement of first clutch C1 and the second clutch C2, so that the rotation of the input shaft 23 is transmitted as is to the output shaft 25.

At the fourth (4TH) speed, i.e., at the highest speed in the D range, on the other hand, the second solenoid valve S2 is also OFF, and the first clutch C1, the second clutch C2, the second brake B2 and the fourth brake B0 are applied. The main transmission unit 19 is in the direct drive state as at the 3rd speed, but the overdrive planetary gear unit 20 has the fourth brake B0 applied as the third clutch C0 is released. As a result, the sun gear $S_1$ is locked by application of the fourth brake B0, and the planetary pinion $P_1$ rotates on its axis, while the carrier $CR_1$ is rotating, to transmit the power to the ring gear $R_1$. As a result, the rotation in the overdrive is transmitted to the input shaft 23 of the main transmission unit 19 in the direct drive state.

At the time of a downshift, on the other hand, the third clutch C0 is applied. The fourth brake B0 is released in the case of a 4–3 shift. In the case of a 3–2 shift, the second clutch C2 is released. In the case of a 2–1 shift, the second brake B2 is released.

At a 1st or 3rd speed in the S range, on the other hand, the operations are identical to those at the 1st or 3rd speed in the D range. At the 2nd speed, not only are the first clutch C1, the third clutch C0 and the second brake B2 applied, but also the third solenoid valve S3 is ON, so that the first brake B1 is applied to lock the sun gear $S_2$ of the main transmission unit 19 thereby producing engine braking.

At 2nd speed in the L range, moreover, the operations are identical to those at the 2nd speed in the S range. At the 1st speed, however, not only are the first clutch C1 and the third clutch C0 applied, but also the third solenoid valve S3 is ON. As a result, the third brake B3 engages to lock the carrier $CR_3$ of the rear planetary gear unit 22 thereby achieving engine braking.

The operations at the 3rd and 4th speeds in the manual transmission mode are identical to those at the 3rd and 4th speeds in the automatic transmission mode. The operations at the 2nd speed in the manual transmission mode are identical to those at the 2nd speed in the S range in the automatic transmission mode and the operations at the 1st speed in the manual transmission mode are identical to those at the 1st speed in the L range in the automatic transmission mode.

Figure 4:
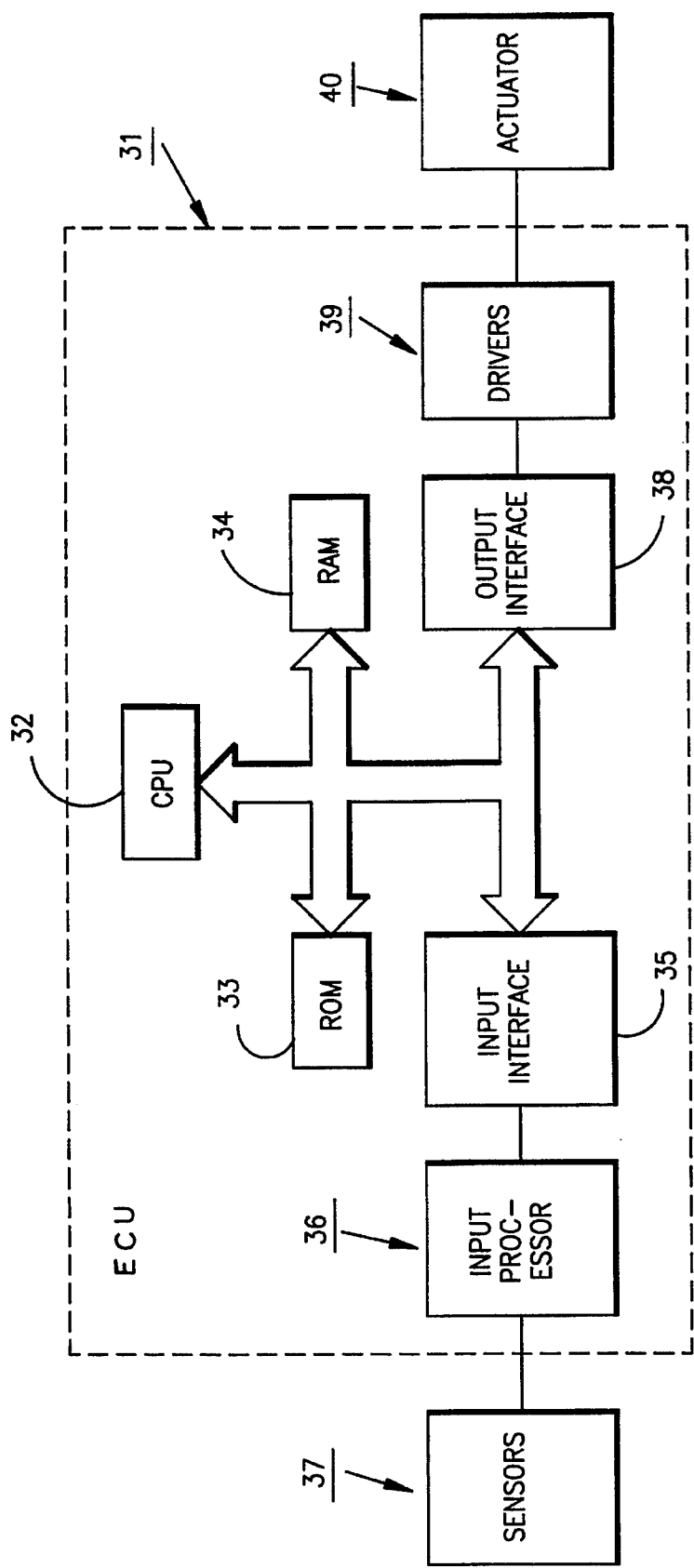
FIG. 4 is a block diagram showing the control unit in the system of FIG. 1.
Figure 5:
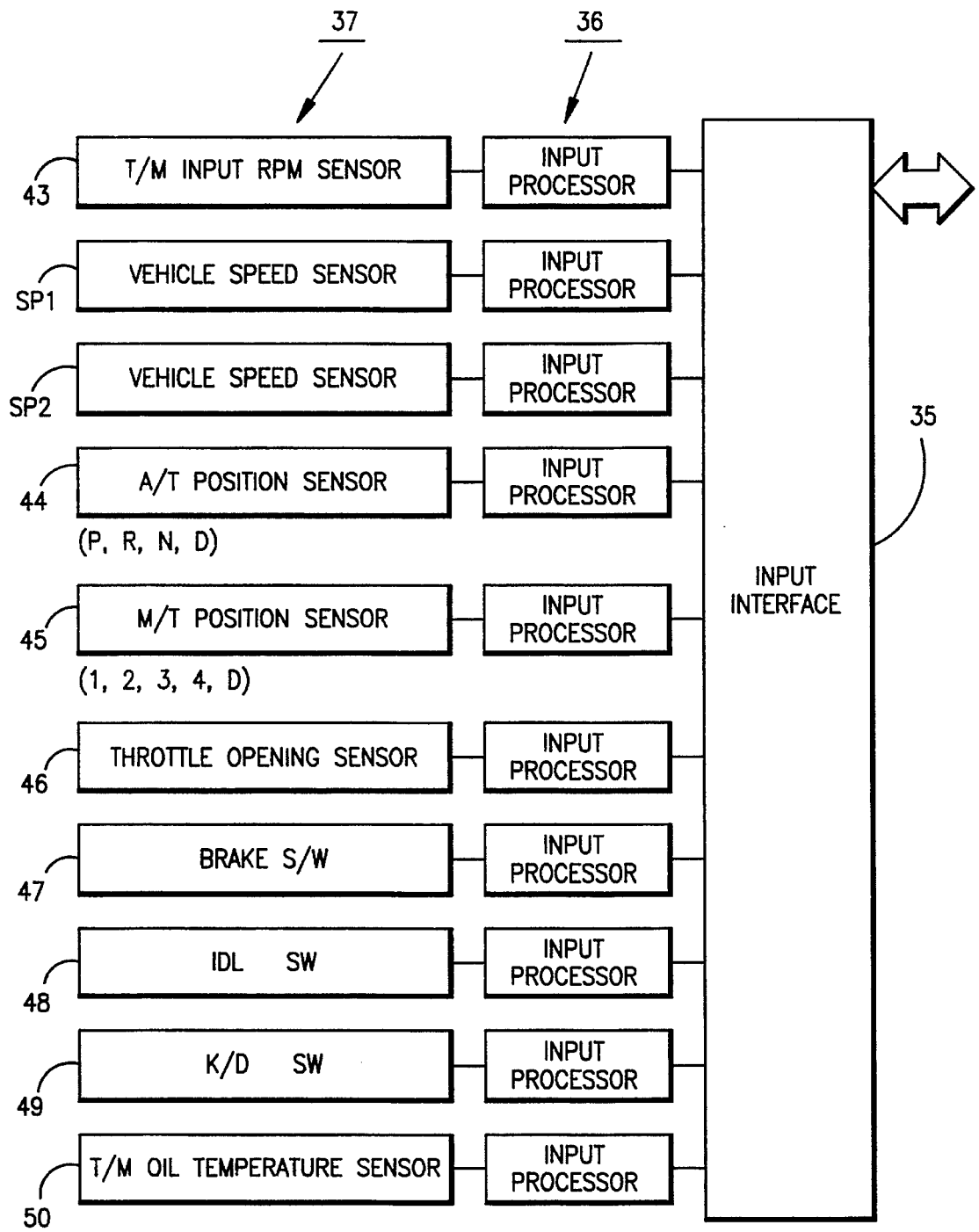
FIG. 5 is a block diagram of an input side of the control unit of FIG. 4.
Figure 6:
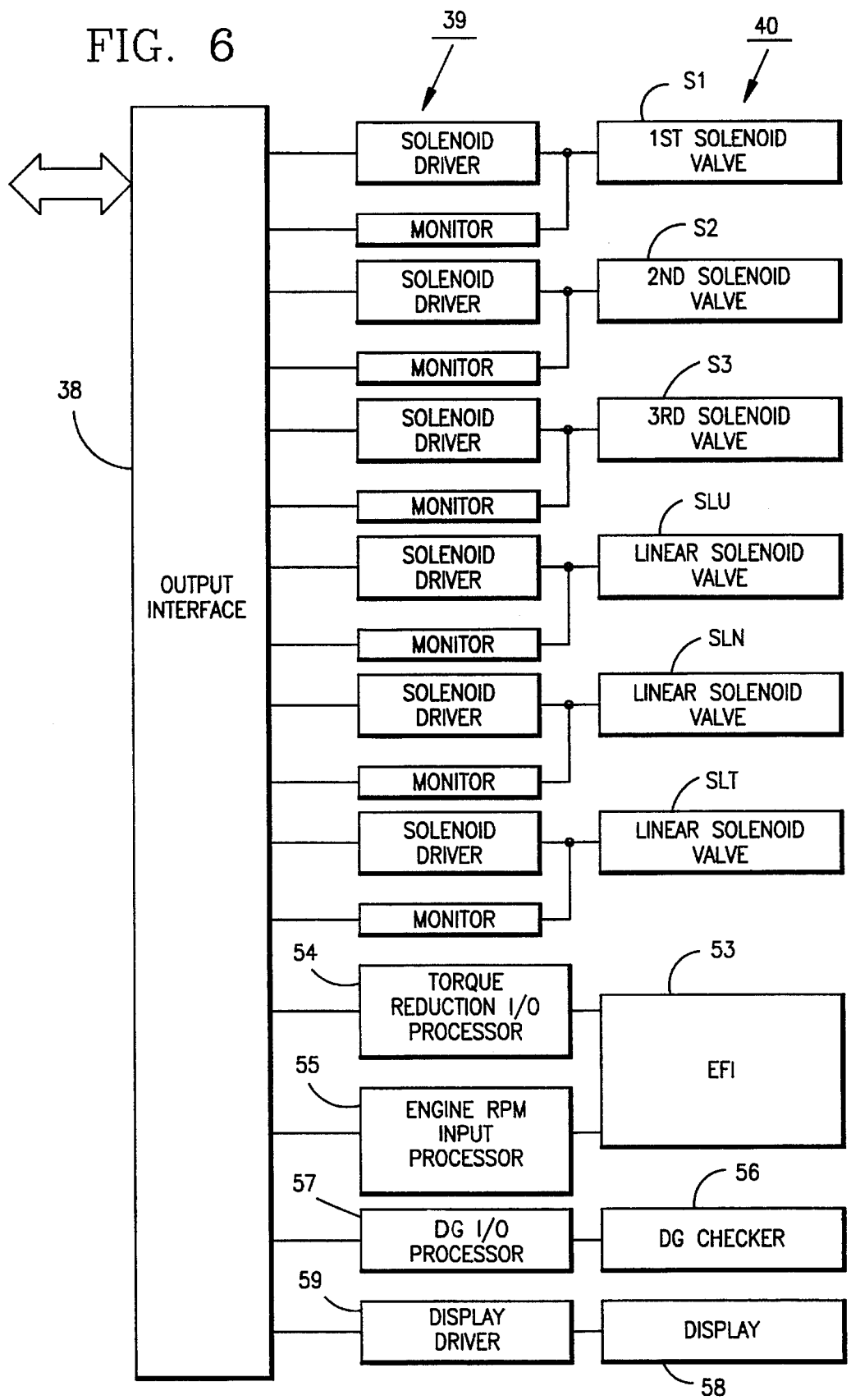
FIG. 6 is a block diagram of an output side of the control unit of FIG. 4.

The control unit 31 (of FIG. 1) of the automatic transmission according to the present invention will now be described with reference to FIGS. 4, 5 and 6.

In these Figures: reference numeral 31 designates a control unit (ECU) for overall control of the automatic transmission; numeral 32 a CPU; numeral 33 a ROM: numeral 34 a RAM: numeral 35 an input interface; numeral 36 an input processor connected with the input interface 35 for processing the inputs of individual signals; and numeral 37 sensors connected with the input processor 36 for outputting the individual signals. Moreover: numeral 38 designates an output interface; numeral 39 drivers connected with the output interface 38 for processing the outputs of the individual signals; and numeral 40 an actuator connected with the drivers 39 and adapted to be driven by the output signals.

An input rpm sensor 43 detects the rpm of the third clutch C0 of the transmission 10 (of FIG. 2). Vehicle speed sensors SP1 and SP2 detect the rpm of the output shaft 25 of the automatic transmission. Vehicle sensor SP1 is used as backup, in case the vehicle speed sensor SP2 encounters trouble, and as the speed meter.

A shift position sensor 44 is provided in the transmission 10 for detecting the position, within an I shift pattern, of the shift lever (not shown) in the automatic transmission (A/T) mode. A shift sensor 46 detects the position of the shift lever, within the H pattern, in the manual transmission (M/T) mode.

A throttle opening sensor 46 is provided in the engine (not shown) for detecting the throttle opening corresponding to engine load, in conjunction with a potentiometer (not shown). A brake switch (SW) 47 is positioned adjacent the brake pedal (not shown) for detecting operation of the brake pedal. An idle switch (IDL) connected to the throttle opening sensor 46 detects when that the throttle is fully closed. A kickdown (K/D) switch 49 is positioned adjacent the accelerator pedal (or connected to the throttle opening sensor 46) for detecting when the throttle is fully open to demand a kickdown. An oil temperature sensor 50 is positioned in the transmission 10 for detecting the oil temperature of the transmission 10.

The aforementioned individual sensors 37 are connected to corresponding input processors 36.

S1 designates a first shifting solenoid valve; S2 a second shifting solenoid valve; and S3 a third shifting solenoid valve, which are switched according to the individual gear stages by turning ON/OFF the corresponding solenoids (not shown). SLU is a linear solenoid valve for the lockup (L-up); SLN is a linear solenoid valve for controlling the back pressure of the accumulator (not shown); and SLT is a linear solenoid valve for controlling the line pressure. Solenoid drivers and monitor circuits connect these individual solenoid valves S1 to S3 and linear solenoid valves SLU, SLN and SLT with the aforementioned output interface 38. The solenoid drivers produce voltages or currents for operating the individual solenoid valves S1 to S3 and linear solenoid valves SLU, SLN and SLT, and the monitors check the individual solenoid valves S1 to S3 and linear solenoid valves SLU, SLN and SLT (self-diagnosis) for a failure.

An engine controller (EFI) 54 controls the engine. A torque reduction input/output processor 54 outputs a signal for temporarily reducing the torque produced by the engine during shifting, to damp the shifting shock. In response to the signal from the torque reduction I/O processor 54, the engine controller 53 retards the ignition timing or cuts the fuel. Numeral 55 designates an engine rpm input processor for inputting the engine rpm.

A DG CHECKER 56 outputs the self-diagnosis by an O/D OFF indicator lamp (not shown) to indicate a failure of the transmission 10 or of the engine controller 53. A DG input/output processor 57 outputs the result of self-diagnosis to the DG CHECKER 56. Numeral 58 designates a display such as the mode selection lamp or O/D OFF indicator lamp (not shown) indicating the state of the transmission 10. Numeral 59 designates a display driver for driving the display 58.

The operations of the control unit 31 will now be described with reference to FIGS. 7, 8, 9 and 10.

Figure 10:
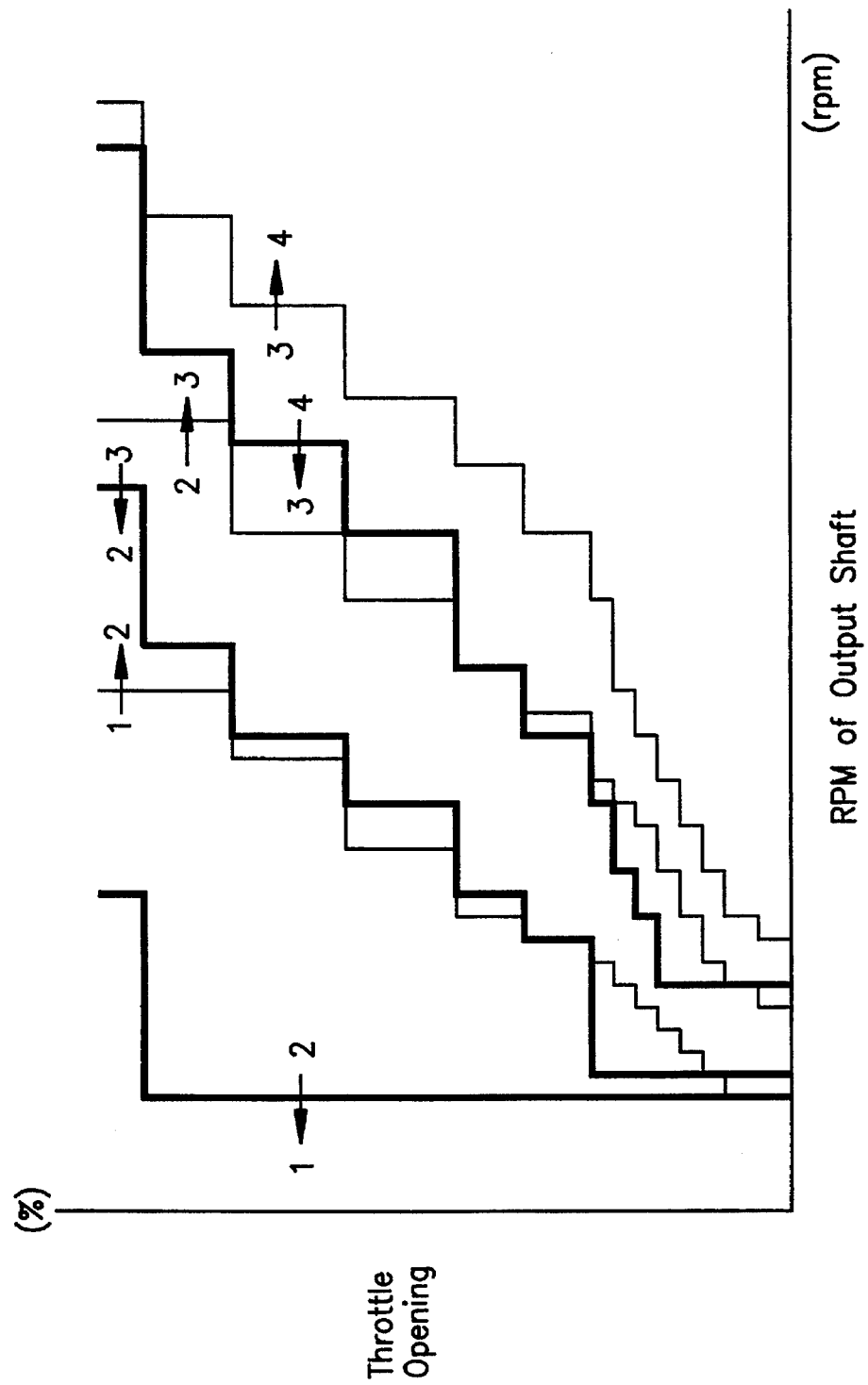
FIG. 10 is a graph illustrating shift diagrams for an automatic transmission mode in the embodiment of the present invention.

In FIG. 10, the abscissa indicates the rpm of the output shaft 25 (of FIG. 2) corresponding to the vehicle speed v, and the ordinate indicates the throttle opening.

Step S1: All the conditions are initialized before the program is started.

Step S2: The rpm of the input shaft 17 and the output shaft 25 of the automatic transmission at present are counted on the basis of the signals coming from the input rpm sensor 43 (of FIG. 5) and the vehicle speed sensors SP1 and SP2 of the automatic transmission.

Step S3: The present range position selected in the I pattern is detected on the basis of the signal coming from the shift position sensor 44 of the automatic transmission. Simultaneously with this, the neutral start switch (N.S.S.W.) is checked for failure.

Step S4: The present throttle opening is computed on the basis of the signal coming from the throttle opening sensor 46.

Step S5: The present oil temperature (i.e., the ATF temperature) of the transmission 10 is computed on the basis of the signal coming from the oil temperature sensor 50.

Step S6: the input signal from the shift position sensor 45 of the automatic transmission is processed to determine the presently selected shift position in the H pattern.

Figure 9:
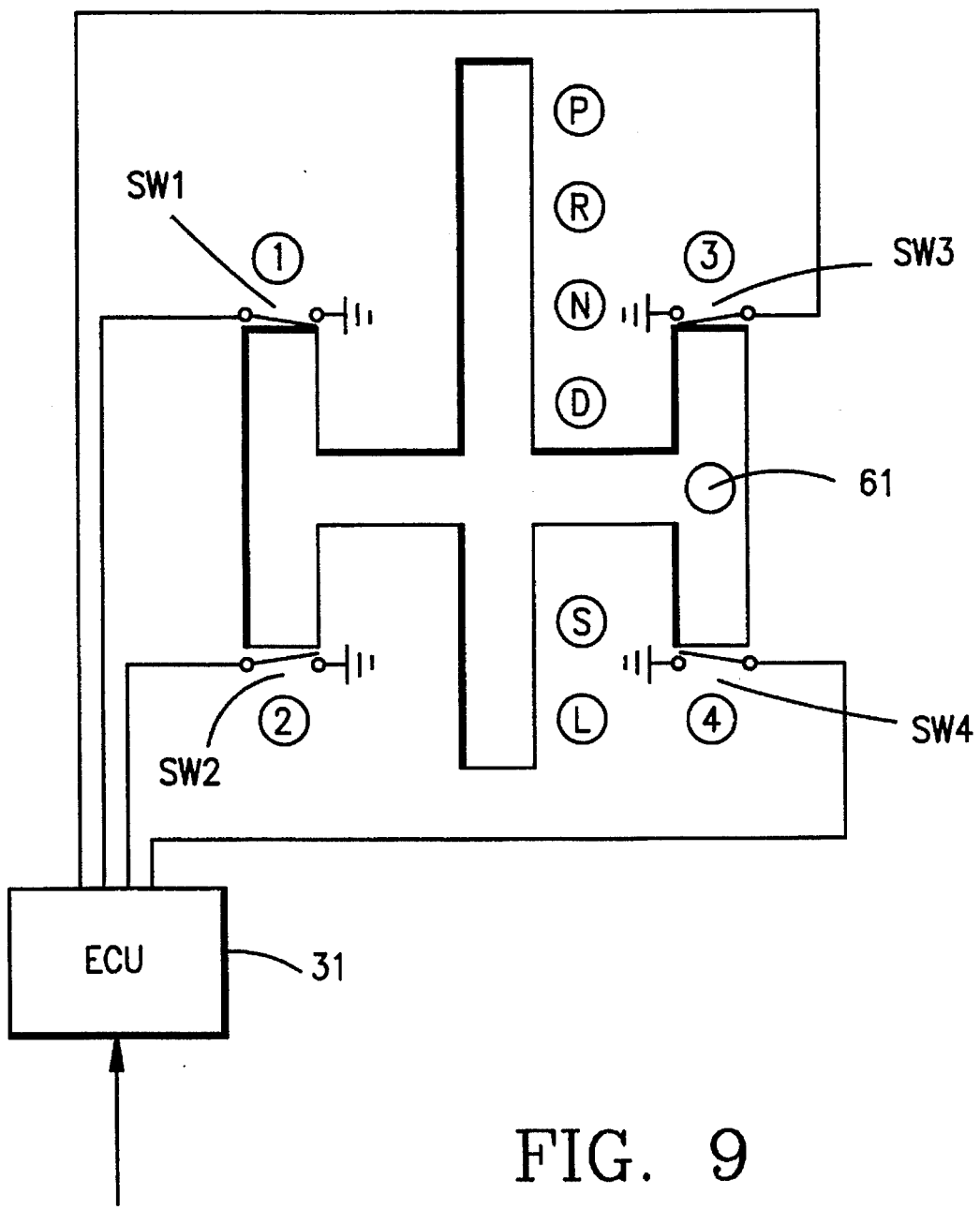
FIG. 9 is a diagram showing a shift pattern of the automatic transmission according to an embodiment of the present invention.

The shift position sensor 45 is equipped, as shown in FIG. 9, with manual shifting switches SW1 to SW4 located in the respective, individual shift positions. In FIG. 9, numeral 31 designates the control unit of the automatic transmission, and numeral 61 designates a shift lever as the shift selector 71 (of FIG. 1). Circled letters designate the individual ranges, and circled numerals designate the individual gear stages. Incidentally, the shift lever 61 can be replaced by an upshift switch and downshift switch for selection of a range in the manual transmission mode.

Step S7: It is decided whether or not any of the manual shifting switches SW1 to SW4 is ON. The routine advances to Step S13, if any of them is ON, but to Step S8 if all are OFF.

Step S8: It is decided whether or not the manual transmission mode flag is ON. The routine advances to Step S16, if the flag is ON, but to Step S9 if the flag is OFF.

Step S9: Automatic transmission data D is read from shift point data MSL of the shift diagram for the automatic transmission mode shown in FIG. 10.

Step S10: The automatic transmission data D is read from lockup point data MSLP of a lockup diagram for the automatic transmission mode.

Step S11: The shift and the lockup in the automatic transmission mode are decided on the basis of the automatic transmission data D read at Step 9 and Step S10 and the various running conditions previously computed.

Step S12: The timing for the shift decision and the lockup decision executed in Step S11 is determined.

Step S13: The manual transmission mode flag is turned ON to place control in the manual transmission mode.

Step S14: The timer (not shown) for returning to the automatic transmission mode is reset.

Step S15: The manual transmission map selecting process is executed to select the shift diagram and lockup diagram for the manual transmission mode and to read the manual transmission data in the shift point data MSL and the lockup point data MSLP.

Step S16: It is decided whether or not the time t measured by the automatic transmission mode returning timer is longer than a preset value $t_1$. The routine advances to Step S15, if shorter than the preset value $t_1$, but to Step S17 if longer than the preset value $t_1$.

Step S17: The manual transmission mode flag is turned OFF, and the routine advances to Step S9 to restore the automatic transmission mode.

Step S18: The shift output and the lockup output ON/OFF in the manual transmission mode are decided on the basis of the manual transmission data read at Step S15 and the previously computed, various running conditions.

Step S19: The timing for starting/ending the shift and the timing for applying/releasing the lockup clutch are decided on the basis of the shift output decision and the lockup output ON/OFF decision of Step S18. Specifically, the timing for applying/releasing the lockup clutch is set so that the lockup clutch is applied immediately after the end of the shift, if lockup ON is decided at Step S18, and that the lockup clutch may be released simultaneously with the start of the shift, if lockup OFF is decided.

Step S20: Whether or not the third shifting solenoid valve S3 (of FIG. 6) is controlled to effect engine braking is decided on the basis of the shift position detected from the signal coming from the shift position sensor 45 and the gear stage corresponding to an output demand.

Step S21: In accordance with the decisions of Steps S11, S12 and S18 to S20, the shift output or the engine braking output is produced to energize the individual solenoid valves S1 to S3 to thereby start the shift or effect engine braking.

Step S22: It is decided whether or not the line pressure should be temporarily raised to shorten the time lag for a shift in the manual transmission mode.

Step S23: The line pressure controlling linear solenoid valve SLT is controlled in accordance with the decision of Step S22.

Step S24: In order to prevent shift shock during the shift, the back pressure is controlled in either the accumulator for the manual transmission (not shown) or the accumulator for the automatic transmission (not shown).

In accordance with the decisions of Steps S11, S12, S18, S19, S23 and S24, the linear solenoid valves SLU, SLN and SLT are controlled, and the routine is returned to Step S2.

Figure 7:
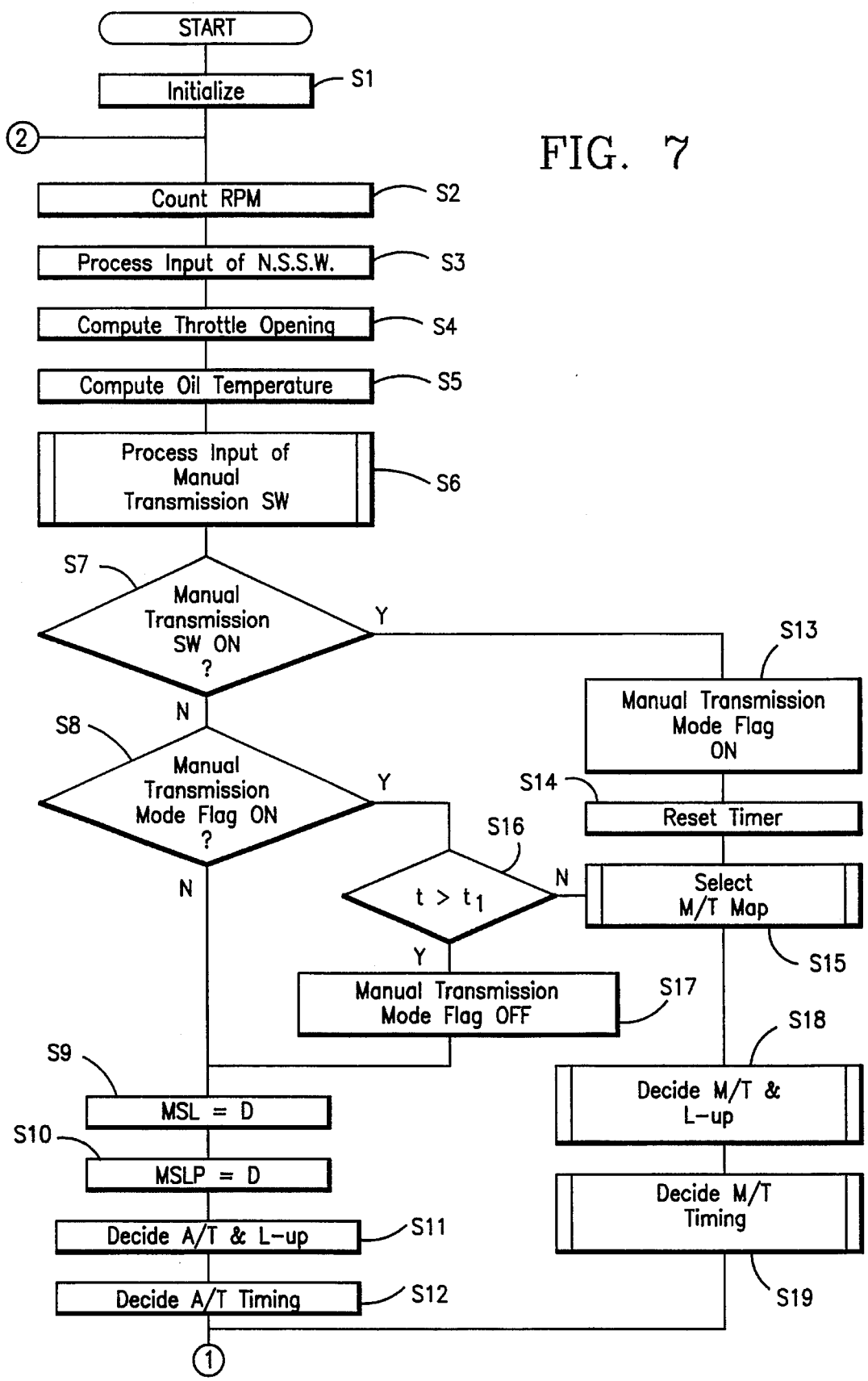
FIG. 7 is a first main control flow diagram showing the control operations of the automatic transmission according to an embodiment of the present invention.
Figure 8:
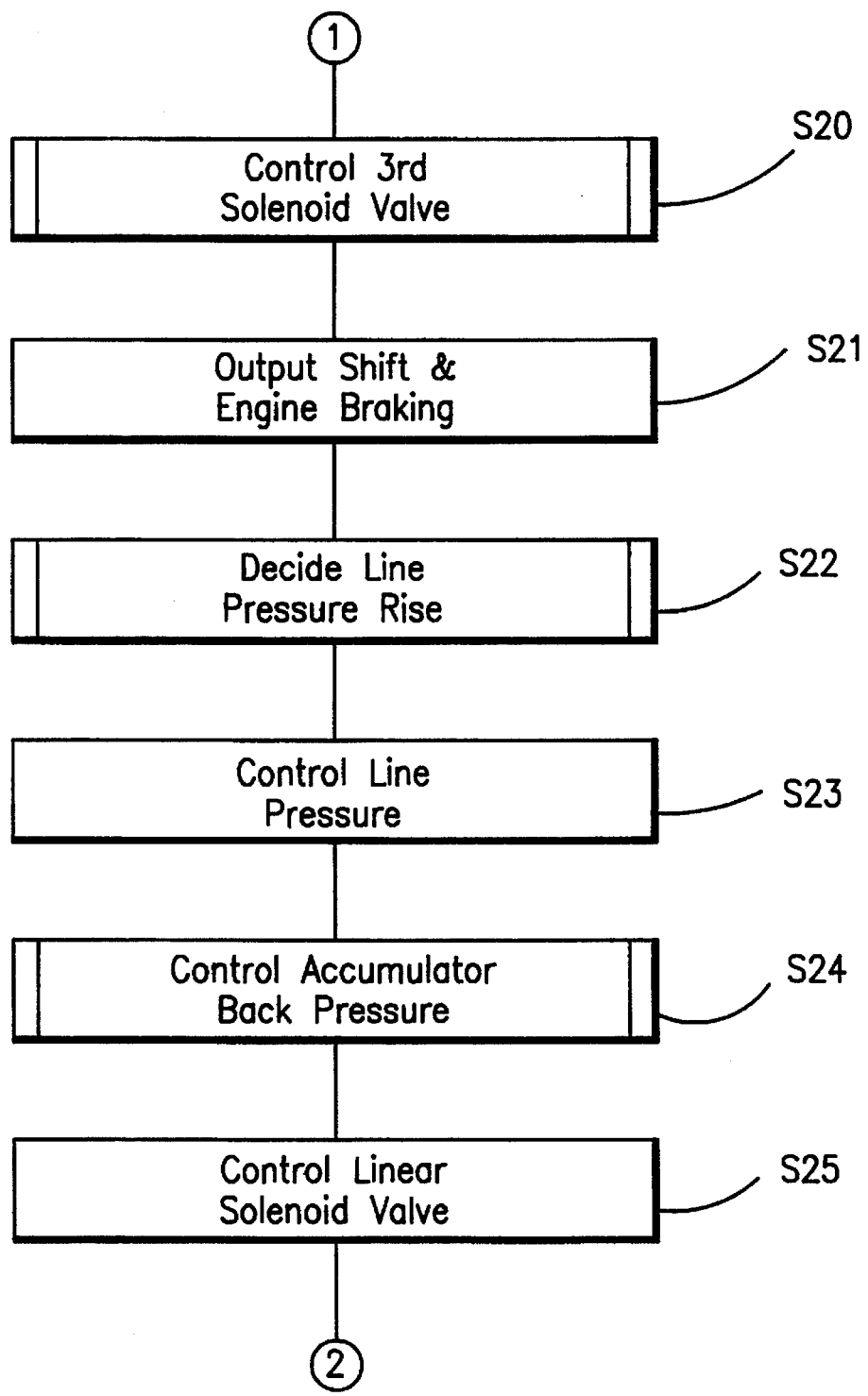
FIG. 8 is a second main flow control diagram showing the control operations of the automatic transmission according to an embodiment of the present invention.

Here will be described the subroutine of Step S15 of FIG. 7 for selecting a manual transmission map with reference to FIGS. 11 and 12.

Figure 11:
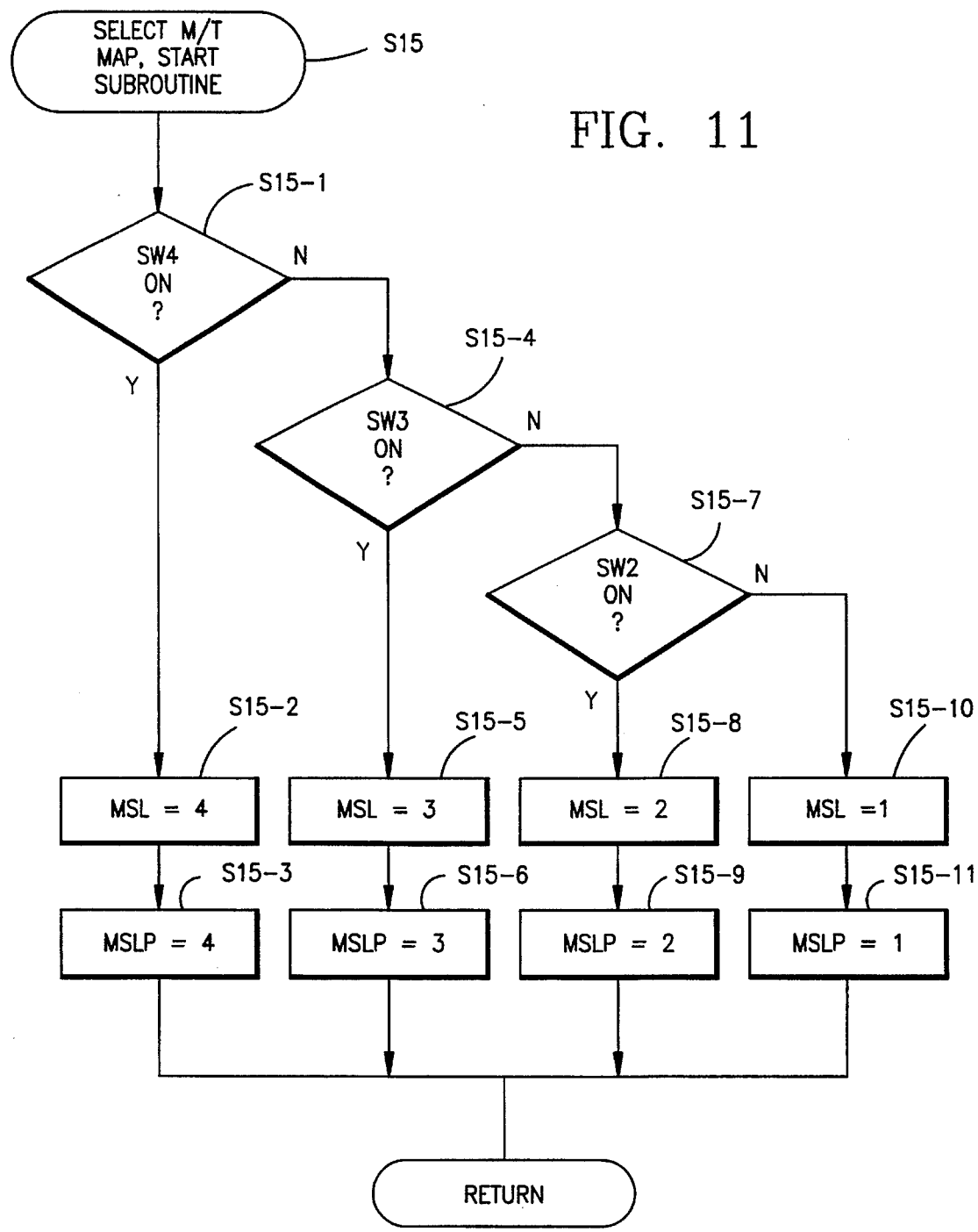
FIG. 11 is a control flow diagram showing a manual selection control process in an embodiment of the present invention.
Figure 12A:
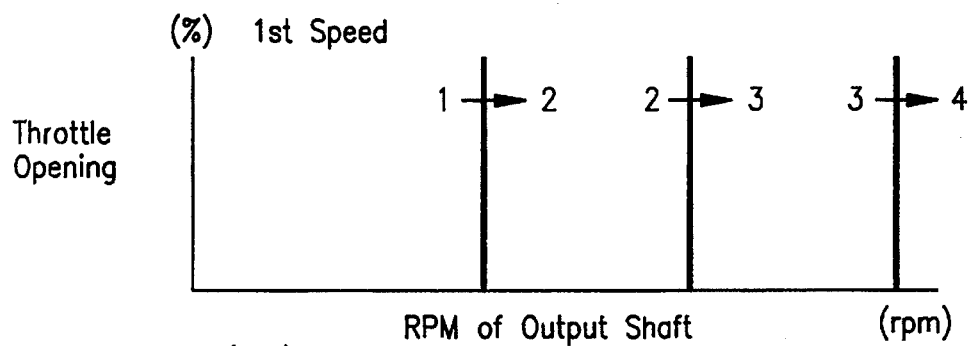
FIGS. 12(a)–12(d) are graphs illustrating shift diagrams for a manual transmission mode in an embodiment of the present invention.
Figure 12B:
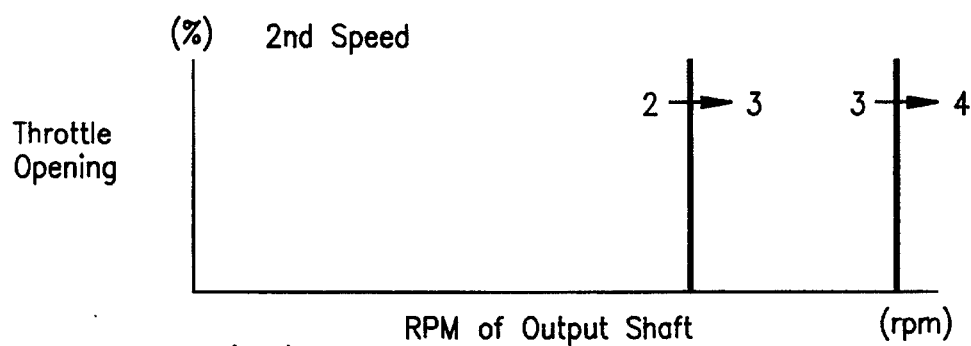
Figure 12C:
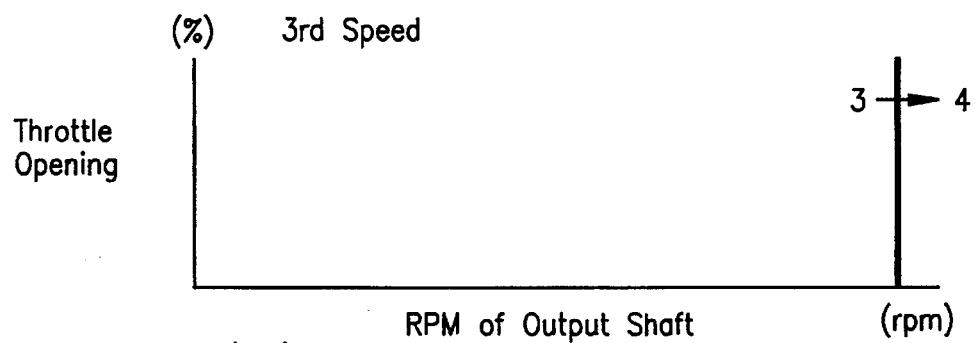
Figure 12D:
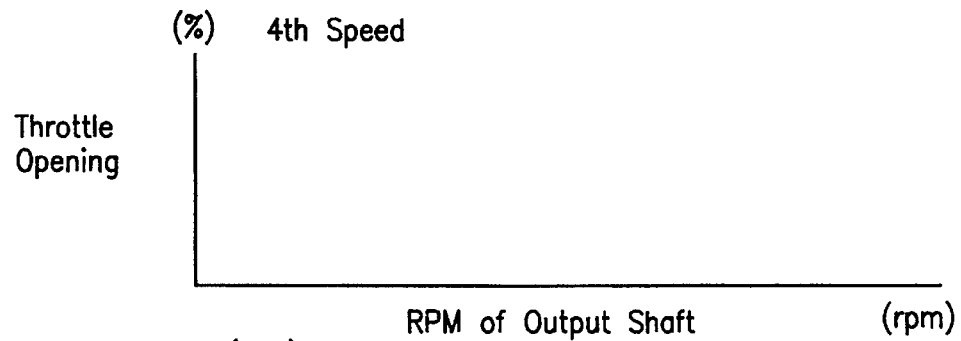

FIG. 11 is a flow chart showing a manual transmission map selecting process according to the present invention. FIG. 12(a) presents a shift diagram for the 1st speed; FIG. 12(b) presents a shift diagram for the 2nd speed; FIG. 12(c) presents a shift diagram for the 3rd speed; and FIG. 12(d) presents a shift diagram for the 4th speed. In FIGS. 12(a)–(d) the abscissa indicates the rpm of the output shaft 25 (of FIG. 2) corresponding to the vehicle speed v, and the ordinate indicates the throttle opening.

Step S15-1: It is decided by the signal from the shift position sensor 45 (of FIG. 5) whether or not the 4th position switch SW4 (of FIG. 9) is ON.

Step S15-2: If it is decided at Step S15-1 that the 4th position switch SW4 is ON, the 4th speed data is read from the shift point data MSL of the shift diagram for the manual transmission mode shown in FIG. 12.

Step S15-3: The 4th speed data is read from the lockup point data MSLP of the lockup diagram for the manual transmission mode.

Steps S15-4 to S15-6: The 3rd speed data is read in a manner similar to Steps S15-1 to S15-3.

Steps S15-7 to S15-9: The 2nd speed data is read in a manner similar to Steps S15-1 to S15-3.

Steps S15-10 and S15-11: The 1st speed data is read from the shift point data MSL and the lockup point data MSLP.

The rotation output by the engine (not shown) is transmitted through the fluid coupling 11 to the transmission 10. When the vehicle speed v reaches a predetermined value, the lockup clutch 15 in the fluid coupling 11 is locked up. In order to achieve a drive feel similar to that of a manual transmission in the manual transmission mode, there are provided the lockup diagram for the automatic transmission mode and the lockup diagram for the manual transmission mode, the latter of which has its lockup area enlarged toward the lower vehicle speed side.

As previously noted, if the lockup area is simply enlarged in the lockup diagram for the manual transmission mode, the engine rpm will change to a degree causing a shock if the lockup clutch 15 is locked up while the vehicle is running within a gear stage. As a result, the driver may be confused into thinking a shift has occurred in the automatic transmission mode. Still worse, driving comfort will be disturbed by the unexpected shock. Therefore, the enlargement of the lockup area in the lockup diagram for the manual transmission mode is restricted so as to avoid shock, and the lockup clutch 15 is locked up simultaneously with a shift, when the shifting conditions are within the ON/OFF hysteresis area of the lockup diagram at the gear stage after the shift. In the present embodiment, the aforementioned shifting conditions are exemplified by the rpm of the output shaft 25 and the throttle opening.

Thus, the lockup clutch 15 is not locked up during running within any gear stage so that the driver will not feel a shock upon lockup. As a result, the lockup clutch 15 can be locked up even at a low vehicle speed, enabling the lockup area to be enlarged without danger of shock.

Figure 13:
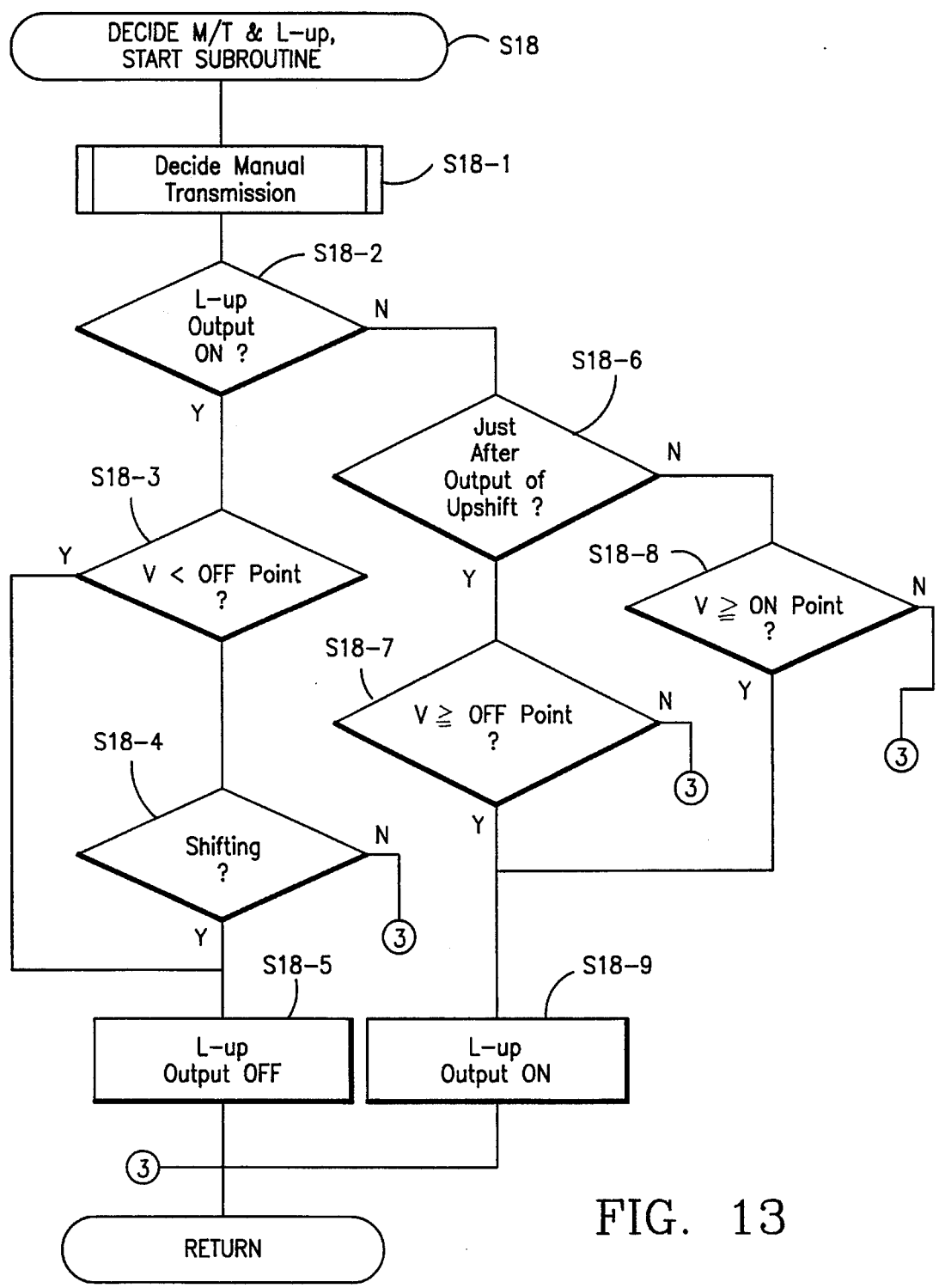
FIG. 13 is a control flow diagram for a manual transmission selection process and lockup deciding process in an embodiment of the present invention.
Figure 14:
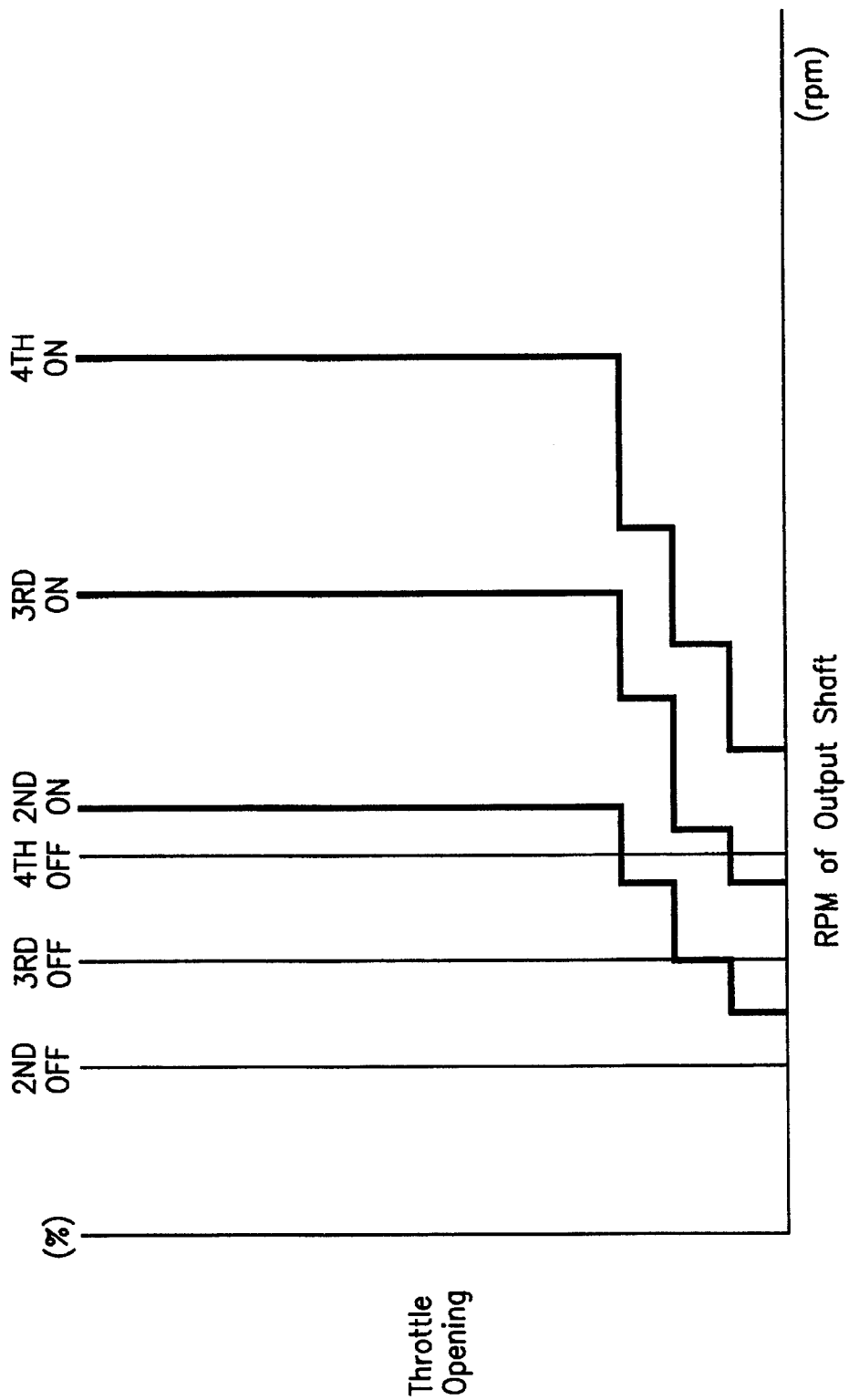
FIG. 14 is a graph illustrating a lockup diagram for a manual transmission mode in an embodiment of the present invention.

Here will be described the subroutine of Step S18 of FIG. 7 for selecting the manual transmission map and for deciding the lockup, with reference to FIGS. 13 and 14. In FIG. 14, the abscissa indicates the rpm of the output shaft 25 (of FIG. 2) corresponding to the vehicle speed v, and the ordinate indicates the throttle opening.

Step S18-1: The gear stage is decided on the basis of the manual transmission data read at Step S15 (of FIG. 7) and the various running conditions previously computed.

Step S18-2: It is decided whether or not the lockup output is ON at present. The routine advances to Step S18-3, if the lockup output is ON, but to Step S18-6 if OFF.

Step S18-3: The lockup OFF point at the gear stage after a shift is computed on the basis of the manual transmission data read from the lockup diagram, as shown in FIG. 14, to decide whether or not the vehicle speed v at present is lower than the aforementioned lockup OFF point. The routine advances to Step S18-5, if the vehicle speed v is lower than the lockup OFF point, but to Step S18-4 if higher than the lockup OFF point.

Step S18-4: It is decided whether or not the transmission is being shifted. The routine advances to Step S18-5 because a shock will occur, if the transmission is being shifted, that is, if the lockup clutch 15 is locked up at the shift transition time, but is returned to Step S18-1 if not.

Step S18-5: The lockup output is turned OFF.

Step S18-6: It is decided whether or not this Step S18-6 immediately follows an upshift output in the flow chart. The routine advances to Step S18-7, if the answer is YES, but to Step S18-8 if NO.

Step S18-8: The lockup OFF point at the gear stage after the shift is computed with the manual transmission data read from the lockup diagram, as shown in FIG. 14, to decide whether or not the vehicle speed v at present is higher than the lockup OFF point. The routine advances to Step S18-9, if the vehicle speed v exceeds the lockup OFF point, but is returned to Step S18-1 if lower than the lockup OFF point.

Incidentally, in the case of a downshift even if the shifting conditions at the instant when the shifting output is produced are within the ON/OFF hysteresis area of the gear stage after the shift, the lockup output is turned OFF simultaneously with the shifting output, to release the lockup of the lockup clutch 15 simultaneously with the shift.

Step S18-9: The lockup output is turned ON.

Figure 15:
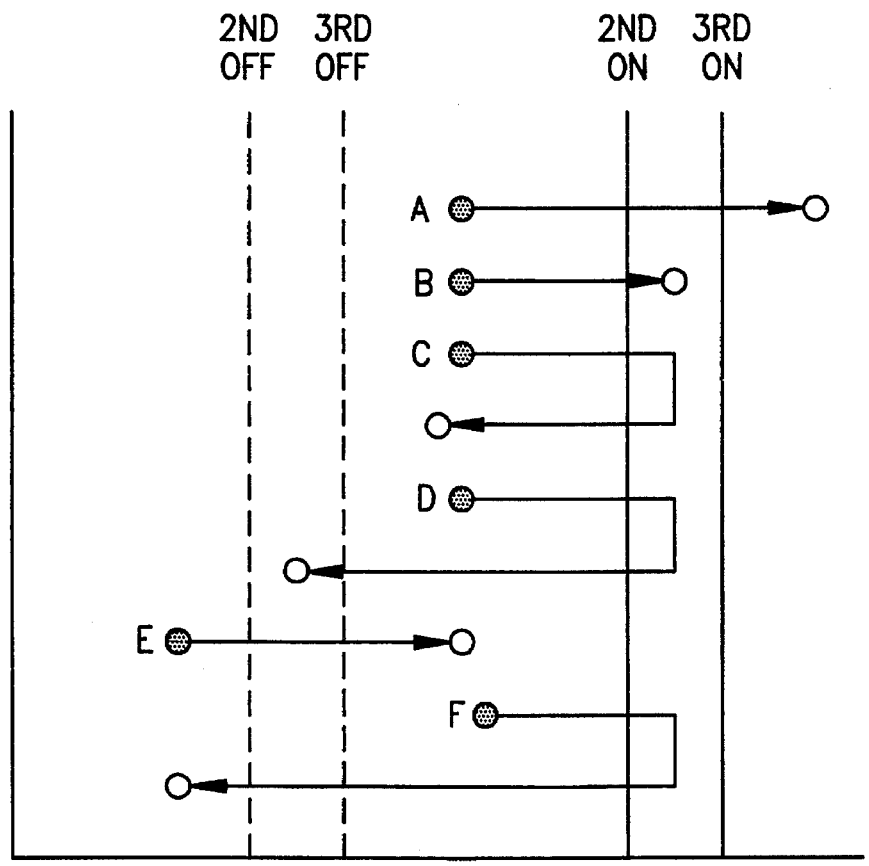
FIG. 15 is a graph illustrating a decision sequence for deciding lockup in an embodiment of the present invention.

Here will be described a lockup deciding sequence in an embodiment of the present invention, with reference to FIG. 15. FIG. 15 shows an example in which a 2–3 shift is effected. In FIG. 15, the abscissa indicates the rpm of the output shaft 25 (of FIG. 2) corresponding to the vehicle speed v, and arrows indicate the changes in the shifting conditions. Moreover, ● symbols indicate the starting points of the changes in the shifting conditions, and symbols ○ indicate the instants when the shifting output is produced.

In pattern A, the rpm rises from the shifting conditions in the ON/OFF hysteresis area of the lockup output diagram so that a 2–3 shifting output signal is produced when the rpm exceeds the lockup ON points of the 2nd speed and the 3rd speed. Since, in this case, the shifting condition for producing the shifting output signal exceeds the lockup ON point of the 3rd speed, the gear stage after the shift, the lockup output is turned ON simultaneously with the production of the shifting output signal so that the lockup clutch 15 is locked up simultaneously with the shift.

In pattern B, on the other hand, the rpm rises from the shifting conditions in the ON/OFF hysteresis area of the lockup output diagram so that the 2-3 shifting output signal is produced when the rpm exceeds the lockup ON point of the 2nd speed. Since, in this case, the shifting conditions for producing the shifting output are within the ON/OFF hysteresis area for the 3rd speed, the gear stage after the shift, the lockup output is turned ON simultaneously with the production of the shifting output signal so that the lockup clutch 15 is locked up simultaneously with the shift.

In pattern C, on the other hand, the rpm rises from the shifting conditions in the ON/OFF hysteresis area of the lockup output diagram so that the 2-3 shifting output signal is produced when the rpm becomes lower than the lockup ON point of the 2nd speed, after it has first exceeded the lockup ON point of the 2nd speed. Since, in this case, the shifting conditions for producing the shifting output signal are within the ON/OFF hysteresis area for the 3rd speed, the gear stage after the shift, the lockup output is turned ON simultaneously with the production of the shifting output signal so that the lockup clutch 15 is locked up simultaneously with the shift.

In pattern D, on the other hand, the rpm rises from the shifting conditions in the ON/OFF hysteresis area of the lockup output diagram so that the 2-3 shifting output signal is produced when the rpm becomes lower than the lockup ON point of the 2nd speed and lower than the lockup OFF point of the 3rd speed, after it has first exceeded the lockup ON point of the 2nd speed. Since, in this case, the shifting conditions for producing the shifting output are outside the ON/OFF hysteresis area for the 3rd speed, the gear stage after the shift, the lockup output is turned OFF simultaneously with the production of the shifting output signal so that the lockup clutch 15 is released simultaneously with the shift.

In pattern E, on the other hand, the rpm rises from the shifting conditions outside the ON/OFF hysteresis area of the lockup output diagram so that the 2-3 shifting output signal is produced when the rpm exceeds the lockup OFF point of the 2nd speed and the lockup OFF point of the 3rd speed. Since, in this case, the shifting conditions for producing the shifting output are within the ON/OFF hysteresis area for the 3rd speed, the gear stage after the shift, the lockup output is turned ON simultaneously with the production of the shifting output signal so that the lockup clutch 15 is locked up simultaneously with the shift.

In pattern F, on the other hand, the rpm rises from the shifting conditions in the ON/OFF hysteresis area of the lockup output diagram so that the 2-3 shifting output signal is produced when the rpm becomes lower than the lockup ON point of the 2nd speed, lower than the lockup OFF point of the 3rd speed and lower than the lockup OFF point of the 2nd speed, after it has first exceeded the lockup ON point of the 2nd speed. Since, in this case, the shifting conditions for producing the shifting output are outside the ON/OFF hysteresis area for the 3rd speed, the gear stage after the shift, the lockup output is turned OFF simultaneously with the production of the shifting output signal so that the lockup clutch 15 is released simultaneously with the shift.

Incidentally, in the present embodiment, in case an abrupt deceleration is caused by using engine braking, for example, the engine may be stalled by the load applied thereto. Therefore, by deciding the kind of shift, the lockup area may be enlarged only at the time of an upshift.

Figure 16:
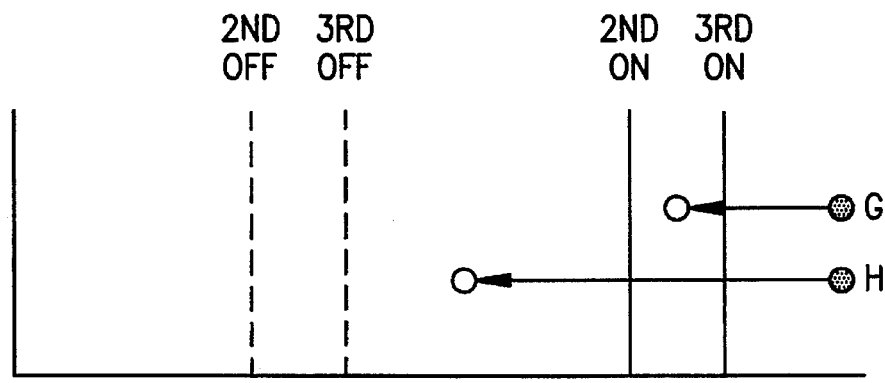
FIG. 16 is a graph illustrating another decision sequence for deciding lockup in an embodiment of the present invention.

FIG. 16 is an explanatory diagram of another sequence for deciding lockup in a 3-2 shift. Symbols ● indicate the starting points of the changes in the shifting conditions, and symbols ○ indicate the instants when the shifting output signal is produced.

In pattern G, the rpm drops from the shifting conditions outside the ON/OFF hysteresis area of the lockup output so that the 3-2 shifting output signal is produced when the rpm becomes lower than the lockup ON point of the 3rd speed. Since, in this case, the shifting conditions for producing the shifting output are outside the ON/OFF hysteresis area of the 2nd speed and since the rpm is higher than the lockup ON point of the 2nd speed, the lockup output is turned ON simultaneously with the production of the shifting output signal so that the lockup clutch 15 is locked up simultaneously with the shift.

In pattern H, on the other hand, the rpm drops from the shifting conditions outside the ON/OFF hysteresis area of the lockup output so that the 3-2 shifting output signal is produced when the rpm becomes lower than the lockup ON point of the 3rd speed and the lockup ON point of the 2nd speed. Since, in this case, the shifting conditions for producing the shifting output signal are in the ON/OFF hysteresis area of the gear stage after a downshift, the lockup output is turned OFF simultaneously with the production of the shifting output signal so that the lockup clutch 15 is released simultaneously with the shift.

Operation of the shift lever in a different embodiment will now be described with reference to FIGS. 17 and 18.

Figure 17:
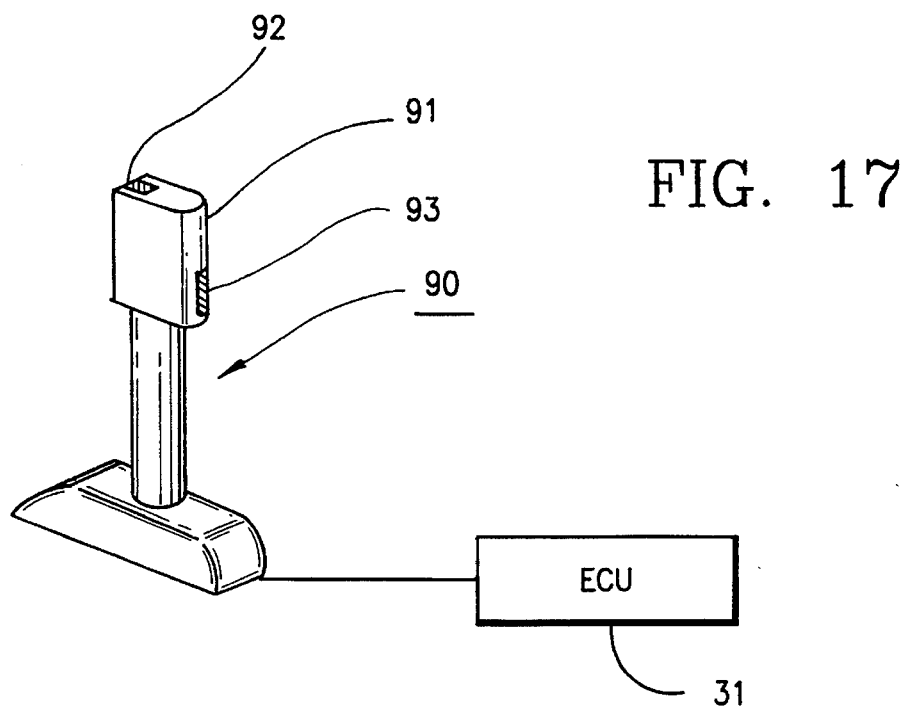
FIG. 17 is a perspective view of a shift lever for operation of an automatic transmission according to another embodiment of the present invention.

In FIG. 17, numeral 90 designates a shift lever, which is arranged with an upshift switch 92 on the top face of its grip portion 91 and a downshift switch 93 below the grip portion 91 at the front side of the vehicle. Both the upshift switch 92 and the downshift switch 93 are connected to the control unit 31.

Figure 18:
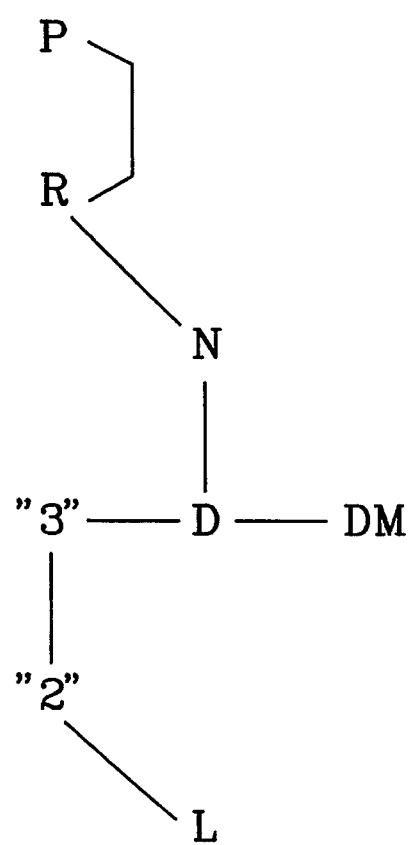
FIG. 18 is a diagram of a shift pattern for the shift lever of FIG. 17.

As shown in FIG. 18, parking, reverse, neutral and drive range positions are provided in the recited order from the front end of the vehicle. At the left-hand side of the drive range position, is the "3rd" speed range position for covering the gear stages of the 1st to 3rd speeds. At the back side of the "3rd" speed range position, is the "2nd" speed range position for covering the gear stages of the 1st and 2nd speeds. At the back side of the "2nd" speed range position, is the low range position.

At the right-hand side of the drive range position, on the other hand, there is the direct mode (DM) position for selecting the manual transmission mode. This direct mode position is arranged with the direct mode switch (not shown).

When the aforementioned shift lever 90 is moved to the aforementioned direct mode position, the direct mode switch is turned ON to establish the manual transmission mode. Then, the gear stages can be shifted up one by one, each time the aforementioned upshift switch 92 is turned ON, and down one by one each time the down switch 93 is turned OFF. In this embodiment, the signals of the upshift switch 92 and the downshift switch 93, in place of the signals of the foregoing switches SW1 to SW4 (of FIG. 9), are fed to the control unit 31.

The present invention is not limited to the foregoing embodiments but can be modified in various manners without departing from the gist thereof, and these various modifications are not intended to be excluded from the scope of the present invention.

What is claimed is:

1. An automatic transmission comprising:
   a fluid coupling;
   a lockup clutch mounted in said fluid coupling;

shift selecting means for selecting one of a plurality of ranges;

a vehicle speed sensor for detecting vehicle speed, and a throttle opening sensor for detecting throttle opening;

control means for setting a gear stage in accordance with the selected range, the detected vehicle speed and the detected throttle opening; for deciding a shift; for producing a shifting output signal; for deciding ON or OFF for said lockup clutch in accordance with the selected range, the detected vehicle speed and the detected throttle opening; and for producing a lockup ON/OFF output signal; said control means comprising:

a memory containing at least one lockup diagram having a lockup ON point, a lockup OFF point and an ON/OFF hysteresis area which is higher than said lockup OFF point and is lower than said lockup ON point;

comparator means for deciding whether or not the detected vehicle speed and the detected throttle opening are lower than said lockup OFF point, whether or not the detected vehicle speed and the detected throttle opening are equal to or higher than said lockup ON point, and whether or not the detected vehicle speed and the detected throttle opening, when said shifting output signal is produced, are within said ON/OFF hysteresis area of said lockup diagram; and lockup output signal generating means for generating a lockup output ON signal if the vehicle speed and the throttle opening are decided by said comparator means to be equal to or higher than said lockup ON point, generating a lockup output OFF signal if the vehicle speed and the throttle opening are decided by said comparator means to be lower than said OFF lockup point, and generating a lockup output ON signal if the vehicle speed and the throttle opening, when said shifting output is produced, are decided by said comparator means to be within said ON/OFF hysteresis area; and oil pressure circuit means for actuating solenoid valves in response to the shifting output signal and the lockup ON/OFF output signal from said control means, said solenoid valves engaging/releasing frictional engagement elements, to achieve the set gear stage, and engaging/releasing said lockup clutch.

2. An automatic transmission according to claim 1, wherein said control means further comprises timing deciding means for deciding the timing for starting and ending said decided shift on the basis of the shifting output signal, which is produced in accordance with the selected range, the vehicle speed and the throttle opening, and for deciding the timing for applying said lockup clutch, immediately after the end of said decided shift, on the basis of the lockup ON output signal which is produced by said lockup output signal generating means on the basis of the decision of said comparator means.

3. An automatic transmission comprising:

a fluid coupling;

a lockup clutch mounted in said fluid coupling; shift selecting means for selecting one of a plurality of ranges;

said plurality of ranges including automatic transmission ranges and manual transmission ranges;

a vehicle speed sensor for detecting vehicle speed, and a throttle opening sensor for detecting throttle opening;

control means for setting a gear stage in accordance with the selected range, the detected vehicle speed and the detected throttle opening; for deciding a shift; for producing a shifting output signal; for deciding ON or OFF for said lockup clutch in accordance with the selected range, the detected vehicle speed and the detected throttle opening; and for producing a lockup ON/OFF output signal; said control means comprising:

a memory containing at least one automatic transmission mode lockup diagram to be utilized when an automatic transmission range is selected, and at least one manual transmission mode lockup diagram to be utilized when said a manual transmission range is selected, said manual transmission mode lockup diagram extending to a lower vehicle speed than said automatic transmission mode lockup diagram and having an ON/OFF hysteresis area;

comparator means for deciding whether or not the detected vehicle speed and the throttle opening, when said shifting output signal is produced, are within the ON/OFF hysteresis area of said one manual transmission mode lockup diagram; and lockup output signal generating means for generating a lockup output ON signal if the vehicle speed and the throttle opening, when said shifting output is produced, are within said ON/OFF hysteresis area; and oil pressure circuit means for actuating solenoid valves in response to the shifting output signal and the lockup ON/OFF output signal from said control means, said solenoid valves engaging/releasing frictional engagement elements, to achieve the set gear stage, and engaging/releasing said lockup clutch.

4. An automatic transmission according to claim 1, wherein said lockup generating means produces said lockup output ON signal if the shifting output signal is for an upshift and if the vehicle speed and the throttle opening, when said shifting output signal is produced, are within the ON/OFF hysteresis area of said lockup diagram.

* * * * *

UNITED STATES PATENT AND TRADEMARK OFFICE
CERTIFICATE OF CORRECTION

PATENT NO. : 5,505,670
DATED : April 9, 1996
INVENTOR(S) : INUZUKA et al

It is certified that error appears in the above-indentified patent and that said Letters Patent is hereby corrected as shown below:

Col. 4, line 10, delete "e" insert --a--;

line 33, "$P_2$" should read --$P_1$--;

line 55, "$CR_1$" should read --$CR_3$--; and line 62, after "FIG." insert --3.--.

Col. 10, line 55, delete "symbols" and, after "Moreover," insert --symbols--.

Signed and Sealed this

Twenty-fourth Day of December, 1996

BRUCE LEHMAN

*Attest:*

*Attesting Officer*   *Commissioner of Patents and Trademarks*